Figure 1:
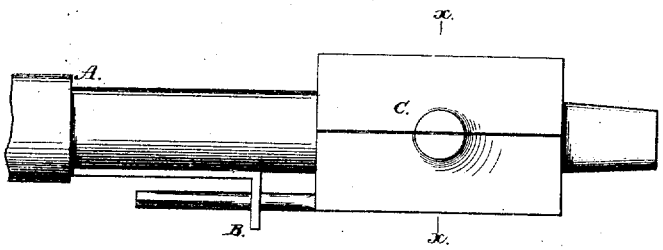

2 Sheets—Sheet 1.

V. T. HALL, dec'd.

H. C Meyer & Co., assignees of John H. Morris, Ex'r.

LOCKING CASE FOR STOP-COCKS.

No. 7,587. Reissued April 3, 1877.

Witnesses;
Geo. H. Graham.
Jacob Tilbel

Henry C. Meyer & Co.
Assignee of
Valentine T. Hall. dec'd.
by
By. J. McIntire
Attorney.

2 Sheets—Sheet 2.

V. T. HALL, dec'd.

H. C Meyer & Co., assignees of John H. Morris, Ex'r.

LOCKING CASE FOR STOP-COCKS.

No. 7,587. Reissued April 3, 1877.

Witnesses:

Geo. H. Graham

Jacob Kelbel

Henry C. Meyer & Co

Assignee of Valentine T. Hall dec'd by J. N. McGuire

Attorney.

UNITED STATES PATENT OFFICE.

HENRY C. MEYER & CO., OF NEW YORK, N. Y., ASSIGNEES OF JOHN H. MORRIS, EXECUTOR OF VALENTINE T. HALL, DECEASED.

IMPROVEMENT IN LOCKING-CASES FOR STOP-COCKS.

Specification forming part of Letters Patent No. 89,930, dated May 11, 1869; reissue No. 7,587, dated April 3, 1877; application filed February 17, 1877.

DIVISION B.

*To all whom it may concern:*

Be it known that VALENTINE T. HALL, of Brooklyn, in the county of Kings and State of New York, did invent a new and useful Locking-Case for Stop-Cocks, and for locking together the stop-cock and the pipe or fitting to which it may be connected; and that the following is a full, clear, and exact description of said invention, reference being had to the accompanying drawings, forming part of this specification, and to the letters of reference marked thereon.

Previous to this invention a want had been felt for some means for the prevention of the operation of the ordinary stop-cocks attached to gas, water, steam, and other pipes and apparatus, and for the prevention of the loosening or removal of either the cocks or the connection from such pipes, so that any improper or unauthorized use of the usual cock to surreptitiously use the gas, steam, or liquid to be drawn through it, or any loosening or removal of the cock or fittings connecting the parts of an apparatus, (to either accidentally or intentionally permit a leakage or discharge of the gas, steam, or liquid,) could be effectually prevented.

The need of some simple and efficient means for the accomplishment of the purposes mentioned had been most felt by gas companies, as without some such contrivance it was not only necessary, in cases of cutting off the supply of gas from consumers, to go to the expense of disconnecting and removing the meters, but there was no way to prevent a fraudulent use of the gas (on the part of the consumer) by disconnecting the ingress and egress pipes of the meter, and making a temporary connection around the meter, so that the latter would not register the gas consumed.

To overcome these difficulties, and supply the want referred to, was the main object of this invention, which consisted in a case or clasp formed of one or more parts, and adapted to inclose or partially inclose or surround the ordinary stop-cock or the connection, and which might be locked over the same to effectually prevent either the operation of the stop-cock in one case, or any separation of the connection in the other case, by reason of encasing such devices, as will be hereinafter more fully explained.

To enable those skilled in the art to make and use this invention, the following description of the construction and operation of the same is given, referring by letters to the accompanying drawings, making part of this specification, and in which—

Figure 2:
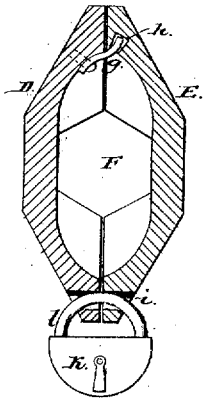
Figure 3:
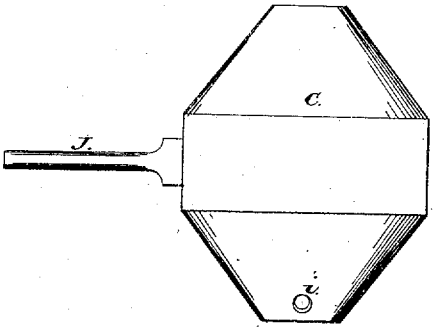
Figure 4:
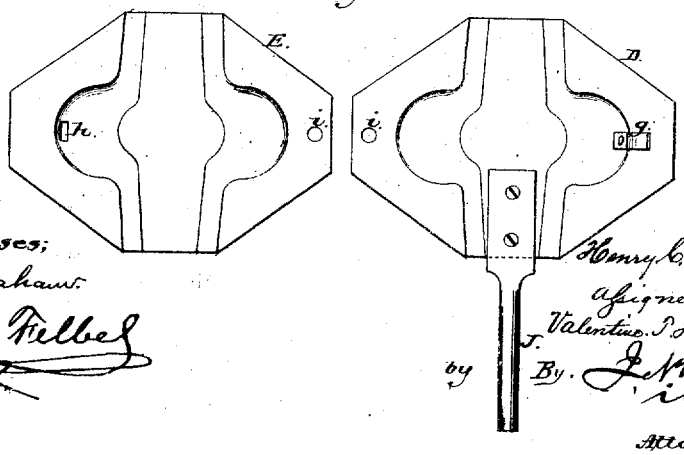
Figure 5:
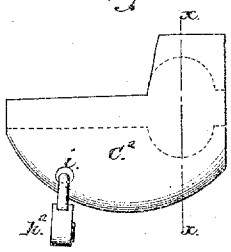
Figure 6:
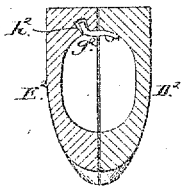
Figure 7:
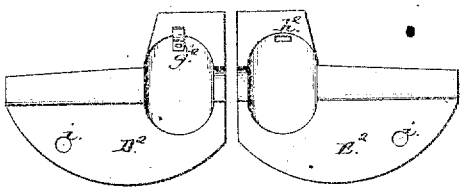

Figure 1 represents, in elevation, a portion of a pipe, and an ordinary stop-cock connected therewith, having applied to it a locking-case, according to the said invention. Fig. 2 is a sectional view of the same at line *x x* of Fig. 1. Fig. 3 is a side view of the locking-case, and Fig. 4 is a view showing the interior of the two halves of said case. At Figs. 5 and 6 are shown, in elevation and cross-section, a modification of the invention in a case or clasp adapted simply to protect what is known as the "union" or loose-thimble connection of the pipe with a gas-meter, or for an analogous purpose; and at Fig. 7 is shown the same modification, with the parts of said case separated and their interiors exposed to view.

In the several figures the same part will be found designated always by the same letter of reference.

A is part of an ordinary pipe, which may be connected with a reservoir or supply source of gas, steam, water, or other fluid or liquid. B is a strap connected therewith, or attached thereto, in any permanent manner. It may be a collar, lug, or flange. C is the case or clasp, which, in the example of the invention illustrated at Figs. 1, 2, 3, and 4, is made, as shown, in two parts, D and E, and has one of its parts provided with a pin or projection, J, that engages with the strap, lug, or collar B, for a purpose to be presently explained. The two parts D and E are so formed that they inclose the stop-cock F, as illustrated, and are connected or coupled together at one end by an interior hook and recess, operating to hinge the parts together.

*g* is the hook, which is permanently attached to one part, D, and *h* is the recess or cavity formed in the other part, E, and with which said hook *g* engages, as most clearly seen at Fig. 2.

In each of the parts D and E is formed a hole, *i*, (see Figs. 2, 3, 4,) for the accomodation of the link *l* of a padlock, K, or some other sort of lock, as seen best at Fig. 2, and when the parts of the clasp or case are put about the cock to be protected, and are locked together, as shown, all access to the cock to operate it will be effectually prevented.

By the employment, in connection with the case or cock protector C, of the pin J, or its equivalent, and the provision of a strap or collar, B, fast to pipe A, and with which said pin J may engage, any turning, relatively, of the pipe and stop-cock, to effect the removal of the cock from the supply-pipe, is effectually prevented; and thus the contrivance, when put in place and locked up, performs the double office, or serves the two purposes of locking up the cock, so that it cannot be operated, and of locking together the stop-cock and the pipe to which it is connected, so that these parts of the apparatus cannot be separated or disconnected.

The lock may be, of course, of any kind, and may be burglar-proof, and as secure as such devices can be made; while by reason of the interior or internal connection between the parts D and E by the hook *g* and recess *h*, or some other such interior device, no opportunity is afforded for picking apart or tampering with hinged ends of the case or clasp C.

The modification of the invention represented at Figs. 5, 6, and 7, is, like that just described, a case, $C^2$, composed of two parts, $D^2$ and $E^2$, hinged or coupled together at one end by an interior hook, $g^2$, and recess $h^2$, and provided with holes *i*, to permit their securement together at the other end by means of a padlock, $K^2$, as illustrated, the variations of form and construction being only such as to adapt the contrivance to the simple purpose of protecting, by encasement, an ordinary union joint, so that it cannot be broken or severed.

It will be seen that, by means of a protector substantially such as shown and described, not only may perfect protection against disruption of joints or couplings be afforded, but also perfect immunity against either any fraudulent operation of the cock, or any removal of the cock from the pipe for fraudulent purposes.

It is, of course, well known that, prior to the invention made the subject of this application, lock-cocks had been used which could be operated only by means of a key, and that, by the use of such cocks, protection as to the use of the cocks was afforded.

Having so fully explained the construction and operation of the invention that any skilled person can make and use it, and wishing it to be understood that while in practicing the invention many variations may be made in the form and detail construction of the parts to adapt the contrivance to varying conditions of application, it should not be confounded with a lock-cock.

What is claimed as new, and desired to be secured by Letters Patent, is—

1. A case or clasp adapted to wholly or partially surround and protect a stop-cock or the union or connection between the cock and the supply-pipe, and which may be locked about the said cock or the said connection, substantially as and for the purpose described.

2. The combination, with a case or clasp adapted to protect a stop-cock, of means for engagement with a strap or lug permanently attached to the pipe with which the stop-cock is connected, substantially as and for the purpose set forth.

3. A protector case or clasp made in parts adapted to be locked together, and provided with an interior or concealed coupling or joint, substantially as and for the purpose set forth.

HENRY C. MEYER & CO. [L. S.]

Signed and sealed in presence of
J. N. McINTIRE,
JACOB FELBEL.